June 25, 1940. T. E. FORSTER, JR 2,205,814
APPARATUS FOR VAPOR-CONDITIONING WHEAT
Filed March 25, 1938 3 Sheets-Sheet 1
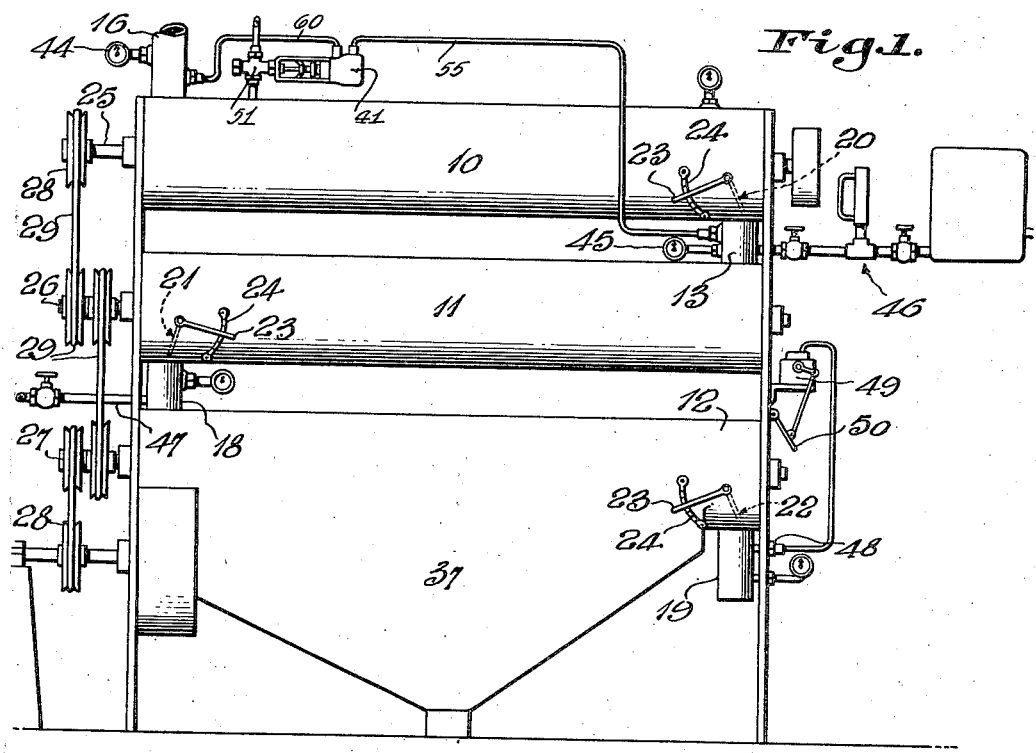
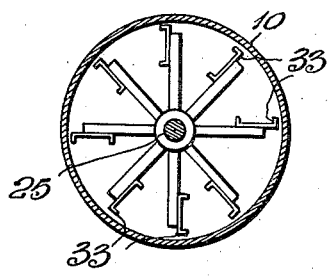
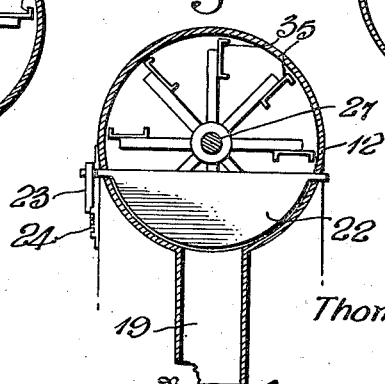
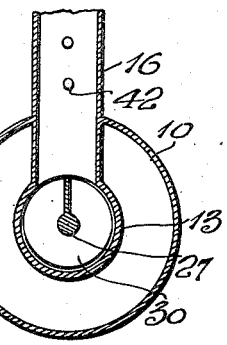
Inventor
Thomas E. Forster, Jr.

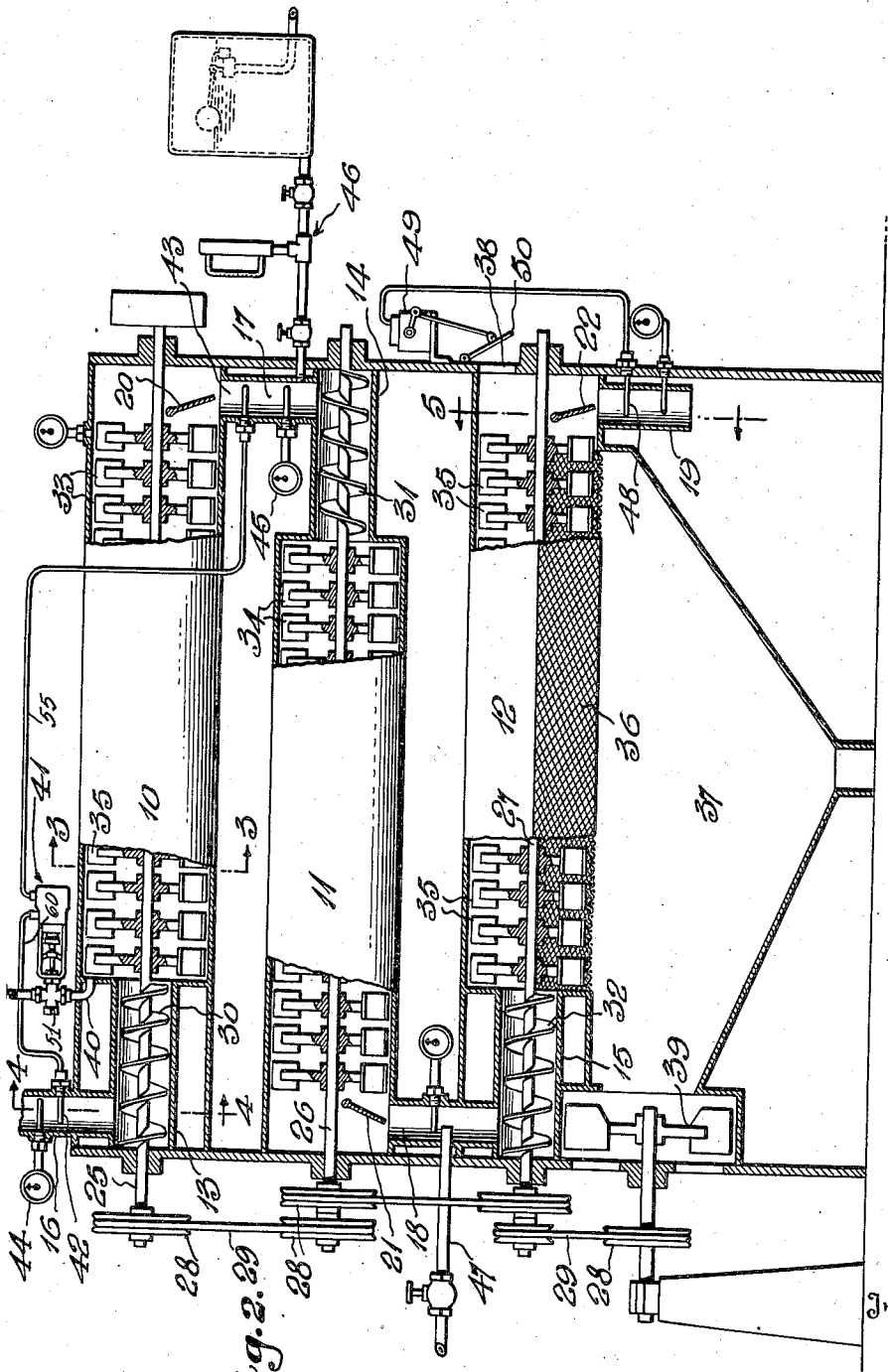

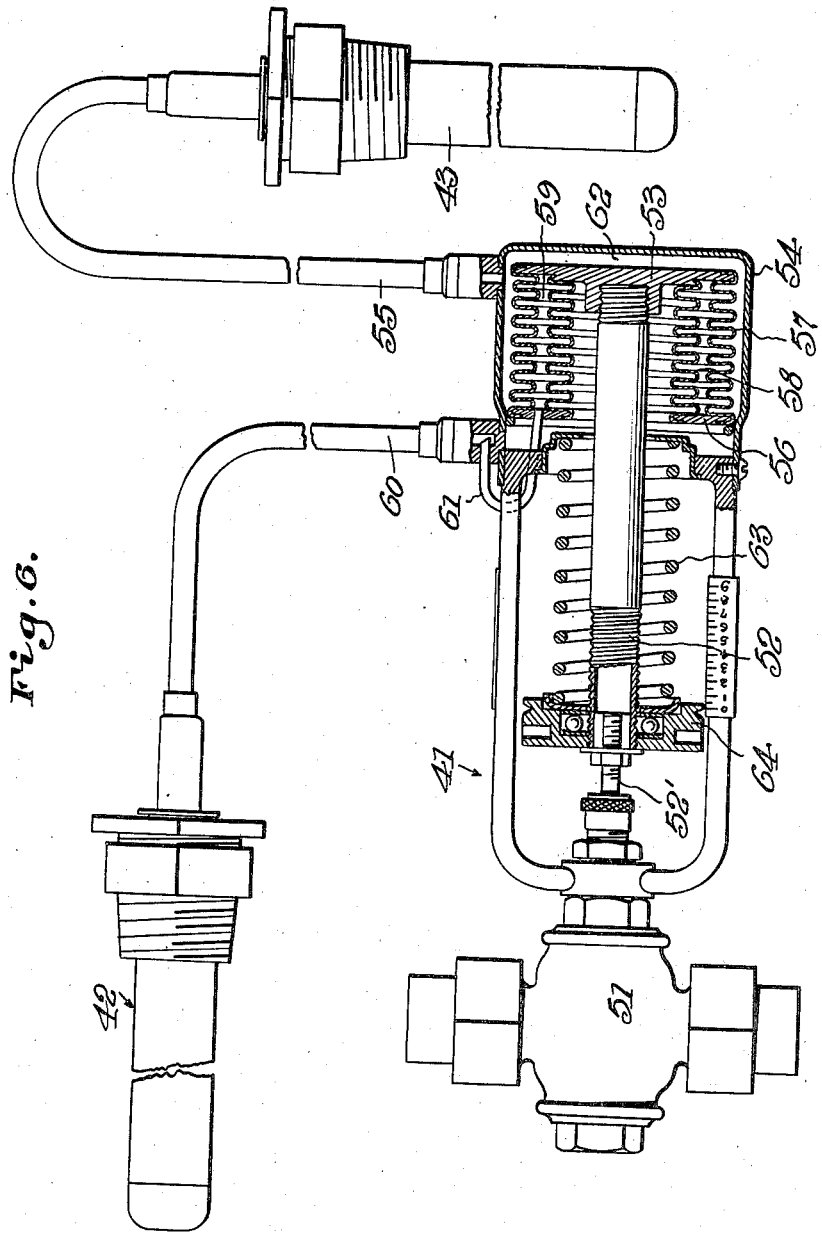

Patented June 25, 1940

2,205,814

UNITED STATES PATENT OFFICE 2,205,814

APPARATUS FOR VAPOR-CONDITIONING WHEAT

Thomas E. Forster, Jr., Wichita, Kans.

Application March 25, 1938, Serial No. 198,144

2 Claims. (Cl. 83—27)

The invention relates primarily to a new and improved process for tempering grain by controlling its temperature and introducing moisture in proper amount, and causing this moisture to penetrate the individual kernels, or berries, in such a manner as to facilitate the breaking and separation of said berries into endosperm products and products composed largely of bran, controlling also the temperature of the grain as the conditioning process is completed, for the same purpose. While the said process is intended principally for conditioning wheat for the purpose of facilitating milling, as above set forth, it is to be understood, that I do not limit the process to wheat only.

One object of the invention is to provide a new and improved process which materially reduces the time required for bringing the grain to any desired moisture content.

Another object is to provide a process which can be carried out continuously, instead of dampening and conditioning the grain in batches.

A still further object is to provide a process which does not require an apparatus occupying a great deal of valuable space.

A still further object is to provide for removing all or a portion of the added heat by evaporating liquid water added to the outer surfaces of the wheat berries expressly for that purpose.

Further still, an object of particular importance is to provide a simple and relatively inexpensive, yet efficient and durable, apparatus for performing the process.

Fig. 1 of the accompanying drawings is a side elevation of the preferred apparatus.

Fig. 2 is a central vertical longitudinal sectional view.

Figs. 3, 4 and 5 are vertical transverse sectional views on line 3—3, 4—4 and 5—5 of Fig. 2.

Figure 6 is a sectional view showing the differential regulator which controls the admission of steam to the apparatus.

The process will first be described without reference to any particular apparatus, and a description of the preferred apparatus will then follow.

The process utilizes warm water vapor, such as low pressure steam, to heat the relatively cool grain to be tempered and to deposit droplets of condensation on said grain. These droplets enter the warm grain effectively dampening same. With respect to wheat, the moisture penetration includes the surfaces of the furrow at the termination of the crease, and includes also the inner surfaces of the various ducts or conduits, formed of cellulose and composing a large part of the bran-coat. These ducts, or conduits, have the functions of capillary tubes, particularly after their outer openings are slightly expanded by the absorption of some of the heat of condensation derived from the warm vapor. The absorptive qualities of grain increase with rise in temperature of the grain, and the first thing necessary, in carrying out the process is to determine the number of degrees which the grain must be heated by the steam to gain 1% in weight due to absorption of the condensation. With this number of degrees determined, the operation of subjecting the grain to the steam is so regulated as to raise the grain temperature said number of degrees for each percent which its weight must be increased by the moisture to be absorbed. I have found that raising the temperature of wheat 20° F. by subjection to the steam causes it to gain substantially 1% in weight due to the absorbed condensation. While 20° temperature rise for each percent of moisture to be added, is not an absolute constant, it is sufficiently near thereto for all practical purposes.

To reach the above determination with regard to wheat, let it be known, first, that the specific heat of wheat is taken at .5 against 1. for water. It is not questioned that 1 lb. of water will give up twice as much heat in cooling 1° F. as 1 lb. of wheat will require in increasing 1° F. in temperature, so it is obvious that for every 1° lost by 1 lb. of water, 2° will be gained by 1 lb. of wheat.

Now suppose that the vapor itself has at the point of admission to the first closed chamber (step one) a temperature of 212° above F. zero. It must have 212 B. t. u. as sensible heat above F. zero per lb., and it must also contain about 970 B. t. u. of latent heat per lb. The total contained heat would be 970 B. t. u. as latent heat and 212 B. t. u. as sensible heat, a total heat of 1,182 B. t. u. per lb., counting sensible heat as above F. zero, as is the custom among engineers. For subsequent calculation in "round numbers," we will consider the 1,182 B. t. u. just mentioned as 1000 B. t. u.

After condensation to liquid form, the water available for absorption by the wheat berries is assumed to have a temperature of 182° above F. zero (this is an assumption, but if the temperature should be higher or lower the point is nevertheless made). Under this assumption (another may be substituted, if desired) each pound of water vaporized in the boiler has acquired, at some time, 212 B. t. u. above F. zero as sensible heat and approximately 970 B. t. u. as latent heat of vaporization, and if that vapor is changed to liquid water in the first chamber (step one) it will have given 970 B. t. u. as latent heat of condensation and a sufficient number of B. t. u. as sensible heat of the liquid to bring its temperature down to a point somewhere between the temperature of the vapor and the temperature of the wheat berries. This is assumed to be 182° F., and it is plain that the 30 degrees lost (from 212 to 182) is exactly equivalent to 30 B. t. u., since 1° F. loss is accompanied by a loss of 1 B. t. u., under certain conditions and nearly enough under the conditions described to meet all practical purposes.

Now the wheat, having a specific heat of .5, increases 2° F. in temperature with the absorption of 1 B. t. u. per lb. Thus, 1 B. t. u. released by 1 lb. of water will raise the temperature of 1 lb. of wheat 2 degrees F. The water condensed is absorbed by the wheat, and it is plain that when 10 B. t. u. are extracted from the 1,000 contained in each lb. of water vapor, the amount of water vapor condensed will be as 10 is to 1,000. This amounts to .01 lb. of water, and .01 lb. is exactly 1% of the weight of the 1 lb. of wheat which received both the heat and the water. The 10 B. t. u. raised the temperature of the wheat 20°; the water released by the loss of the 10 B. t. u. from the vapor weighed .01 lb., which is 1% of the weight of the wheat affected. It will thus be seen that for each 20° F. rise in the wheat temperature, the weight of the wheat will be increased substantially 1%.

With the above example, the necessary increase in temperature for other grains to cause a gain of 1% in weight due to the absorbed moisture, can readily be determined, and the process practiced accordingly.

The process is preferably performed in a closed container to which (for example) wheat is continuously fed and to which the warm vapor or steam is admitted as required. This vapor is preferably at a pressure equal to, or nearly so, the pressure of the atmosphere. There are two factors to be considered in connection with the water absorption. First, the vapor is condensed into a liquid. Second, the infinitesimal droplets of condensed vapor are absorbed by the materials composing the bran coat. These materials are of cellulose composition and they are in contact with strips of cellulose which extend completely through the wheat berry, dividing the endosperm into very small flour cells. Capillarity draws the fine water particles inward, and the action is rapid because the berries have been slightly expanded by the heat they have absorbed, and because the water particles are so small that they are readily carried to the capillary tubes.

After addition of the required moisture in the manner above described, the wheat is too hot for milling and must be cooled. Of the greatest importance in connection with wheat tempering with this or any other method is the temperature of the wheat when it undergoes the first milling operation, commonly known as "the first break." It is well known that wheat is very brittle when cold and very soft when hot, but is correct for milling with an optimum temperature somewhere in between. It is obvious that when warm wheat is subjected to contact with air capable of absorbing water in the form of vapor, the contained moisture of the grain will be diminished by evaporation. Cooling will be accomplished by reason of this evaporation, but it is plain that if no other provision be made for providing the water to be vaporized, said water will come from the wheat berry itself. This would tend to undo what had been done in causing moisture to penetrate the berries and would in a measure defeat the whole purpose of conditioning. I make provision, however, whereby the loss of moisture contained in the wheat berries may be avoided and still take full advantage of the cooling due to evaporation and the removal of sensible heat as latent heat of vaporization by adding to the outer surfaces of the berries, sufficient water to supply the vaporization needs, and I then subject the berries, with this added water on their surfaces, to air currents sufficient to remove the resultant vapor as rapidly as it is formed, thus facilitating further evaporation and cooling until the grain is cooled to the desired temperature. The wheat berries are in this manner properly prepared for milling by controlling their temperatures at the optimum point and at the same time retaining the moisture in the interior of the berries at the optimum amount and the optimum position.

It is convenient and extremely useful to know what the increase of moisture in the grain will be in relation to the temperature rise, and to control both thermostatically, but the addition of water for conditioning purposes need not be confined to the amount that can be obtained through condensation of water vapor. After the absorption of the grain, of say 1% moisture effected by a sufficient number of B. t. u.'s, to increase its temperature about 20 degrees (more heat and therefore more moisture may be added if desired), the conduits of the bran-coat and the partition walls of the endosperm are expanded to such an extent as to permit a measured amount of liquid water added to the outer surfaces of the berries to move inwardly by virtue of capillary action until the contained moisture of the endosperm is as great as is desirable.

It is important to the process that the original vapor be brought into intimate contact with the wheat berries, and for this reason it is essential that the wheat berries be suspended in the vapor for a few seconds or be subjected to an agitating operation which effects the same purpose. An agitating operation is preferred. The process is preferably carried on continuously by feeding wheat into a closed chamber without permitting appreciable entrance of air, except that contained in the interstices of the entering grain; continuously retaining some of the wheat in said chamber; continuously agitating the retained wheat; and admitting the warm vapor to the chamber as required to continuously regulate the temperature to which the wheat is raised. Admission of the warm water vapor or steam is so regulated that the condensation thereof produces a partial vacuum in the closed chamber, assisting in expanding the berries to facilitate absorption of the water of condensation.

Referring now to the drawings for the construction of the preferred apparatus, 10, 11 and 12 denote superposed substantially horizontal cylinders supported in any preferred manner. The cylinders 10, 11 and 12 are provided with wheat inlet tubes 13, 14 and 15 respectively, said tubes being disposed coaxially with said cylinders. A chute 16 is provided into the tube 13 to conduct the wheat to be conditioned into said tube; another chute 17 is provided to discharge the wheat from the cylinder 10 into the tube 14 of the cylinder 11; a third chute 18 is employed to discharge the wheat from the cylinder 11 into the tube 15 of the cylinder 12, and a final wheat outlet chute 19 leads from said cylinder 12. Transverse adjustably mounted gates 20, 21 and 22 are provided across the discharge ends of the three cylinders 10, 11 and 12, to retain a predetermined amount of wheat in said cylinders and to permit the surplus to discharge. For adjusting these gates, they may each be provided with an adjusting arm such as 23, engageable with a sector or the like 24.

Three shafts 25, 26 and 27 extend axially through the cylinders 10, 11 and 12 respectively, and through the tubes 13, 14 and 15 of these cylinders, said shafts being operatively connected with each other by pulleys 28 and belts 29. Shaft 25 is provided with a wheat-feeding worm 30 in the tube 13; shaft 26 is provided with a similar worm 31 in the tube 14, and shaft 27 is equipped with a similar worm 32 in the tube 15. The three shafts 25, 26 and 27 are also provided with a plurality of wheat-lifting and dropping cups 33, 34 and 35 respectively, which so lift and drop the wheat in the three cylinders as to keep this wheat thoroughly agitated and to separate the berries from intimate contact with each other.

The cylinders 10 and 11 are substantially airtight, and the worms 30, 31 and 32 keep the tubes 13, 14 and 15 so full of the wheat that no appreciable amount of air can enter either of said cylinders as the wheat enters or leaves, thus making it possible to create a partial vacuum in said cylinders as hereinafter described. The lower side of the cylinder 12, however, is in the form of a screen 36 through which bees wing, scourings and the like may pass into a subjacent hopper 37 from which they may be either continuously conducted or removed from time to time as desired. At a point above the screen 36, one end of the cylinder 12 is provided with an air inlet 38, and at a point below said screen 36 at the other end of said cylinder 12, an air exhausting fan 39 is provided for drawing air through the screen 36 and the wheat thereon, not only cleaning the latter but performing a cooling and drying operation as hereinafter explained.

A pipe line 40 is provided for conducting the warm vapor from a boiler or the like in which it is generated, to the cylinder 10 for contact with the wheat in this cylinder to heat the wheat and produce water of condensation on the berries for absorption by the latter. A differential regulator 41 is provided for the line 40, to control the amount of the warm vapor entering the cylinder 10. This differential regulator is provided with one thermostatic bulb 42 in the wheat inlet chute 16 of the cylinder 10, and with another thermostatic bulb 43 in the outlet chute 17 of said cylinder 10. These two thermostatic bulbs jointly actuate the differential regulator 41 to admit the required amount of warm vapor to raise the wheat to the required temperature necessary to obtain the predetermined moisture impregnation. In order to set the regulator 41 to cause it to automatically control the admission of vapor according to the temperature requirements of the wheat, it is preferable to provide two thermometers 44 and 45 adjacent the thermostatic bulbs 42 and 43 respectively. The thermometer 44 shows the temperature of the ingoing wheat; the miller knows the temperature which the outgoing wheat must have in order to absorb the necessary moisture; he may adjust the regulator 41 until the thermometer 45 shows the proper outgoing temperature for the wheat, and thereafter the admission of the warm vapor will be automatic, said vapor being admitted in such quantity as to maintain the required wheat temperature.

The regulator 41 is a conventional differential regulator, the value of which is controlled by the two thermostatic bulbs 42 and 43. These two bulbs oppose each other in such manner that they jointly act to regulate the valve. Therefore, by the use of such a regulator, the temperature of the wheat entering through chute 16 and that of the wheat leaving through chute 17 are made to automatically control the regulator 41 to admit the warm vapor according to requirements, to raise the wheat temperature to the predetermined degree necessary for proper tempering but no higher. The regulator 41 so controls the admission of the warm vapor or steam that condensation thereof produces a partial vacuum in the closed chamber 10, assisting in expanding the berries to facilitate absorption of the water of condensation.

The regulator 41 is shown in section in Fig. 6. The steam-controlling valve is shown at 51, said valve having an actuating stem composed of adjustably connected sections 52 and 52'. The section 52 carries a head 53 within a casing 54 to which a tube 55 extends from the so-called "hot" bulb 43. A circular plate 56 is mounted in the inner end portion of the casing 54 and is fluid-tightly connected at its edge with the casing wall. Extending from this plate 56 to the head 53 and fluid-tightly connected to both said plate and head, are an outer Sylphon bellows 57 and an inner Sylphon bellows 58. The chamber 59 between bellows 57 and bellows 58 is in communication with a tube 60 extending to the so-called "cold" bulb 42, communication between said chamber 59 and the adjacent end of tube 60 being preferably established by means of a U-tube such as 61 which facilitates assembly. The "hot" bulb 43, tube 55 and the space 62 within the casing 54, around the head 53 and bellows 57, are charged with some suitable liquid readily expansible and contractible under temperature changes. Similarly, the "cold" bulb 42, tube 60, tube 61 and chamber 59 are charged with the same or an equivalent liquid. As the two charges are caused to expand and contract according to the grain temperatures to which the bulbs 42 and 43 are subjected, it will be seen that said charges exert opposing forces on the head 53 and the valve stem 52, 52', said forces serving to move the valve 51 toward open or closed position according to the grain requirements. A spring 63 is preferably provided exerting a force on the valve stem 52, 52', in valve-closing direction, and an adjusting nut 64 is provided for so adjusting said spring as to initially set or to, at any later time, set the regulator 41 to maintain the desired temperature differential between ingoing and outgoing grain.

If desired, additional water may be supplied to the wheat entering the second cylinder 11, and for this purpose, I have disclosed a conventional water feeding apparatus 46. The water admitted by this apparatus is well mixed with the wheat by the worm 31, making it readily available for absorption.

Water (automatically regulated if desired) for cooling the vapor-treated wheat may be admitted to the chute 18 through a suitable valve controlled pipe 47, this water being mixed with the wheat by the worm 32. The water-treated wheat is worked over and along the screen 36 by the cups 35 and while the wheat is being thus agitated, the air blast from the inlet 38 to the fan 39, evaporates any of the cooling water adhering to the exteriors of the wheat berries, as well as assisting in cleaning the prepared wheat. The admission of the cooling water adds a surplus of moisture to the wheat and thus when any moisture remaining on the exteriors of the berries is evaporated, there is no danger of reducing the moisture content beyond that required.

The amount of air to be admitted through the inlet 38 may be controlled by the temperature of the wheat being discharged through the chute 19. I have, therefore, disclosed a thermostatic bulb 48 in the chute 19 for controlling (in a conventional way) an electric motor 49 which actuates a valve or gate 50 for said inlet 38, to govern the admission of the water-evaporating and wheat-cooling air blasts so as to insure the required temperature for the wheat, necessary for proper milling.

From the foregoing taken in connection with the accompanying drawings, it will be seen that novel and advantageous provision has been made for carrying out the objects of the invention. While preferences have been disclosed, variations may, of course, be made within the scope of the invention as claimed.

I claim:

1. An apparatus for vapor-conditioning grain, comprising a closed grain-receiving chamber through which the grain passes, said chamber having a grain inlet and a grain outlet, steam inlet means for said chamber, and differential regulating means for said steam inlet means, said differential regulating means having two thermostatic controlling elements jointly operable to control said differential regulating means, one of said thermostatic controlling elements being subjected to the temperature of the grain entering said chamber, the other of said thermostatic controlling elements being subjected to the temperature of the grain leaving said chamber, said differential regulating means being jointly controlled by said thermostatic controlling elements to admit steam in required quantity to so heat the grain as to insure the desired absorption of moisture.

2. An apparatus for vapor-conditioning grain comprising a closed chamber through which the grain passes, said chamber having grain feeding means at one end and grain discharging means at its other end, both said feeding means and said discharge means being of such construction as to prevent appreciable entrance of air, a steam inlet for said chamber, and differential regulating means for said steam inlet having one thermostatic control bulb subjected to the grain entering said chamber and a second thermostatic control bulb subjected to the grain discharging from said chamber, said differential regulating means being jointly controlled by said bulbs to admit steam in required quantity to so heat the grain as to insure the desired absorption of moisture.

THOMAS E. FORSTER, Jr.